(12) United States Patent
Okamoto et al.

(10) Patent No.: US 11,242,476 B2
(45) Date of Patent: Feb. 8, 2022

(54) EPOXY RESIN ADHESIVE AGENT

(71) Applicant: SUMITOMO SEIKA CHEMICALS CO., LTD., Hyogo (JP)

(72) Inventors: Masafumi Okamoto, Himeji (JP); Norihiro Sugihara, Himeji (JP); Taiji Matsukawa, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 15/102,981

(22) PCT Filed: Dec. 2, 2014

(86) PCT No.: PCT/JP2014/081848
§ 371 (c)(1),
(2) Date: Jun. 9, 2016

(87) PCT Pub. No.: WO2015/093281
PCT Pub. Date: Jun. 25, 2015

(65) Prior Publication Data
US 2016/0355711 A1      Dec. 8, 2016

(30) Foreign Application Priority Data
Dec. 16, 2013    (JP) .............................. JP2013-259158

(51) Int. Cl.
*C09J 163/00*       (2006.01)
*C08L 23/06*        (2006.01)
*C09J 11/08*        (2006.01)

(52) U.S. Cl.
CPC ............ *C09J 163/00* (2013.01); *C08L 23/06* (2013.01)

(58) Field of Classification Search
None
See application file for complete search history.

(56) References Cited

U.S. PATENT DOCUMENTS

| | | | |
|---|---|---|---|
| 2006/0079609 A1 | 4/2006 | Nishioka et al. | |
| 2012/0183777 A1* | 7/2012 | Yoshikawa | G03G 9/0804 428/406 |
| 2012/0208926 A1* | 8/2012 | Funabiki | C09D 7/65 523/408 |

FOREIGN PATENT DOCUMENTS

| | | | |
|---|---|---|---|
| JP | S61-040371 A | | 2/1986 |
| JP | S63-090530 A | | 4/1988 |
| JP | 07228847 A | * | 8/1995 |
| JP | H07-228847 A | | 8/1995 |
| JP | 2001-261931 A | | 9/2001 |

(Continued)

OTHER PUBLICATIONS

Horiba Scientific "A Guidebook to Particle Size Analysis", Horiba Instruments, Inc. 2016.*

(Continued)

*Primary Examiner* — Ha S Nguyen
(74) *Attorney, Agent, or Firm* — Sughrue Mion, PLLC

(57) ABSTRACT

The present invention provides an epoxy resin adhesive that exhibits low shrinkage and excellent adhesiveness. The epoxy resin adhesive includes (A) an epoxy resin, (B) a curing agent, and (C) a particulate polyolefin-based resin having a volume average particle size of 1 to 25 μm, wherein the particulate polyolefin-based resin is spherical, and wherein the particulate polyolefin-based resin is present in an amount of 1 to 50 parts by mass per 100 parts by mass of the epoxy resin.

20 Claims, 1 Drawing Sheet

(56) References Cited

FOREIGN PATENT DOCUMENTS

| JP | 2001-279056 A | | 10/2001 |
|---|---|---|---|
| JP | 2002-105283 A | | 4/2002 |
| JP | 2005-036136 A | | 2/2005 |
| JP | 2006-265337 A | | 10/2006 |
| JP | 2006265337 A | * | 10/2006 |
| JP | 2008-038070 A | | 2/2008 |
| JP | 2009-114241 A | | 5/2009 |
| JP | 2009-167360 A | | 7/2009 |
| JP | 2010189550 A | * | 9/2010 |

OTHER PUBLICATIONS

Hara, "Curing Agents for Epoxy Resin," Three Bond Technical News, Issued Dec. 20, 1990, pp. 1-10. (Year: 1990).*
International Search Report for PCT/JP2014/081848 dated Feb. 17, 2015.

* cited by examiner

EPOXY RESIN ADHESIVE AGENT

CROSS REFERENCE TO RELATED APPLICATIONS

This application is a National Stage of International Application No. PCT/JP2014/081848 filed Dec. 2, 2014, claiming priority based on Japanese Patent Application No. 2013-259158 filed Dec. 16, 2013, the contents of all of which are incorporated herein by reference in their entirety.

TECHNICAL FIELD

The present invention relates to an epoxy resin adhesive for use in, for example, semiconductor sealants. More specifically, the present invention relates to an epoxy resin adhesive that exhibits low shrinkage and excellent adhesiveness.

BACKGROUND ART

Semiconductor products have recently become thinner, lighter, and more highly integrated. This requires adhesives that locally and thinly seal semiconductor connecting parts.

Such adhesives are in the transitional stage from lead-free soldering to thermosetting resins (i.e., epoxy adhesives). However, because of the increased heat generation due to the high integration of semiconductor devices, when thermally expanded or shrunk, epoxy adhesives are likely to form cracks or spots, and thereby cause disconnection at the periphery of the devices. Or when shrunk by cooling, epoxy adhesives are prone to cause the coated substrate to deform.

To respond to such circumstances, a low-shrinkable epoxy resin composition has been disclosed which is obtained by melting and mixing an epoxy resin serving as a sealing resin with a polyolefin-based resin or an elastomer resin as a stress relaxing agent (shrinkage inhibitor) using a twin-screw kneader or roller (Patent Literature 1 and 2).

Another proposed solution is to add particles to an epoxy adhesive to improve the adhesive without changing the composition of the epoxy resin. For example, the following are disclosed: a liquid sealing resin composition containing polymer particles having a layered structure prepared by coating the surface of a low-elastic polymer serving as a core with a glassy polymer to achieve low-thermal expansion (Patent Literature 3); an epoxy-based composition containing crosslinked fine particles in an amount of 50% by weight or more based on an epoxy resin in its formulation of the thermosetting resin to achieve stress relaxation (Patent Literature 4); and an epoxy-based adhesive composition containing particles that are largely composed of acrylic rubber to improve shrinkage properties (Patent Literature 5).

CITATION LIST

Patent Literature

Patent Literature 1: JPS63-090530A
Patent Literature 2: JP2001-279056A
Patent Literature 3: JP2001-261931A
Patent Literature 4: JP2005-036136A
Patent Literature 5: JP2008-038070A

SUMMARY OF INVENTION

Technical Problem

Methods for preparing a novel epoxy resin composition by melting in an epoxy resin other resin(s) to inhibit the resulting adhesive from shrinking during thermal curing as disclosed in Patent Literature 1 to 3 require heating kneaders, such as twin-screw kneaders and rollers, to homogeneously mix additive(s) with the epoxy resin. In addition, the epoxy resin composition prepared by this method contains a caulking agent (filler), such as molten silica and wax, in an amount of 70% by mass or more based on the total amount of the epoxy adhesive to prevent the curing reaction after kneading and to achieve coatability or flowability of the epoxy adhesive. Thus, the adhesion performance and physical properties of the epoxy resin itself are not considered satisfactory.

Although the conventional methods comprising adding particles to an epoxy resin adhesive can easily improve the physical properties of the epoxy adhesive, most of the materials added are rubber or elastomer particles. Such particles have been used to improve the low shrinkage properties attributed to stress relaxation, and are not designed from the standpoint of the adhesion performance of epoxy adhesives, or the compatibility or dispersibility of the particles with respect to epoxy adhesives. Thus, adding a large amount of such particles to an epoxy resin adhesive as in the prior art may lead to an uneven coating film surface, decreased adhesiveness, or a thickened adhesive due to poor compatibility between the particles and the epoxy resin adhesive, or difficulty in homogeneously dispersing the particles. Moreover, shrinkage occurring during cooling is likely to deform the coated substrate, and cause wrinkles, warping, and the like.

Solution to Problem

The present inventors focused on the functionality and the particle size of particles, and studied the particle size, the amount, and the functional group of particulate polyolefin-based resins, as well as surface treatments of the particles. The study found that combining an epoxy resin adhesive with a suitable amount of specific particles can address the problems associated with low shrinkage of epoxy resin adhesives and particle dispersibility, thus providing an epoxy resin adhesive that exhibits excellent adhesiveness and low shrinkage. Accordingly, the inventors completed the present invention.

Specifically, the present invention encompasses, for example, the following subject matter.

Item 1.

An epoxy resin adhesive including (A) an epoxy resin, (B) a curing agent, and (C) a particulate polyolefin-based resin having a volume average particle size of 1 to 25 µm, wherein the particulate polyolefin-based resin is spherical, and wherein the particulate polyolefin-based resin is present in an amount of 1 to 50 parts by mass per 100 parts by mass of the epoxy resin.

Item 2.

An epoxy resin adhesive including (A) an epoxy resin, (B) a curing agent, and (C) a particulate polyolefin-based resin having a volume average particle size of 1 to 25 µm, wherein the particulate polyolefin-based resin is spherical, and wherein the particulate polyolefin-based resin is present in an amount of 1 to 50 parts by mass per 100 parts by mass of the total amount of the epoxy resin and the curing agent.

Item 3.

The epoxy resin adhesive according to Item 1 or 2, wherein the polyolefin-based resin includes at least one member selected from the group consisting of low-density polyethylene, high-density polyethylene, a copolymer of ethylene with an epoxy group-containing monomer, a copolymer of ethylene with a modified acid group-containing monomer, and a copolymer of ethylene with an ethylenically unsaturated monomer.

Item 4.

The epoxy resin adhesive according to any one of Items 1 to 3, wherein the particulate polyolefin-based resin is coated with silica.

Item 5.

The epoxy resin adhesive according to Item 4, wherein the amount of silica is 0.1 to 1 parts by mass per 100 parts by mass of the particulate polyolefin-based resin.

Item 6.

An agent for inhibiting shrinkage caused by curing an epoxy resin adhesive, the agent including a spherical-particulate polyolefin-based resin having a volume average particle size of 1 to 25 µm.

Advantageous Effects of Invention

The present invention can provide an epoxy resin adhesive that exhibits suppressed shrinkage when cured as well as excellent adhesiveness by adding specific particles to an adhesive.

DESCRIPTION OF EMBODIMENTS

Figure 1:
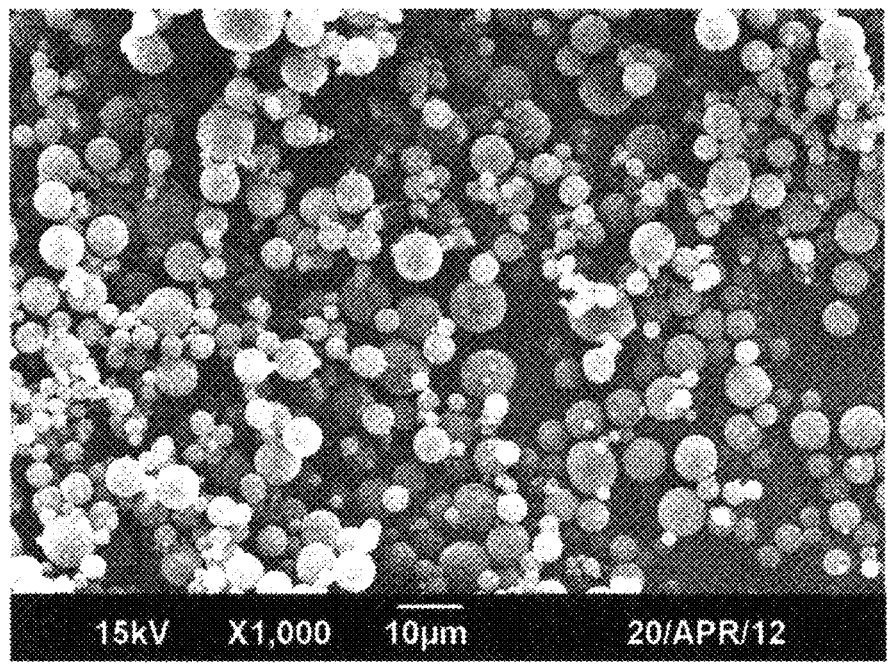
FIG. 1 shows the results of electron microscope observation of particles obtained in Production Example 3.

The epoxy resin adhesive according to the present invention includes (A) an epoxy resin, (B) a curing agent, and (C) a particulate polyolefin-based resin having a volume average particle size of 1 to 25 µm.

The epoxy resin (A) for use in the present invention is not limited as long as the epoxy resin contains epoxy groups, and is curable. Examples include mono-epoxy compounds and polyvalent epoxy compounds.

Examples of mono-epoxy compounds include butyl glycidyl ether, hexyl glycidyl ether, phenyl glycidyl ether, allyl glycidyl ether, para-butylphenyl glycidyl ether, para-xylyl glycidyl ether, glycidyl acetate, glycidyl butyrate, glycidyl hexoate, and glycidyl benzoate.

Examples of polyvalent epoxy compounds include bisphenol epoxy resins, epoxy resins prepared by glycidylating dihydric or polyhydric phenols, novolac epoxy resins, aliphatic ether epoxy resins, ether ester epoxy resins, ester epoxy resins, amine epoxy resins, and alicyclic epoxy resins.

Examples of bisphenol epoxy resins include bisphenol A, bisphenol F, bisphenol AD, bisphenol S, tetramethyl bisphenol A, tetramethyl bisphenol F, tetramethyl bisphenol AD, tetramethyl bisphenol S, tetrabromo bisphenol A, tetrachloro bisphenol A, and tetrafluoro bisphenol A.

Examples of epoxy resins prepared by glycidylating dihydric or polyhydric phenols include epoxy resins prepared by glycidylating dihydric phenols, such as biphenol, dihydroxynaphthalene, and 9,9-bis(4-hydroxyphenyl)fluorene; epoxy resins prepared by glycidylating trisphenols, such as 1,1,1-tris)4-hydroxyphenyl)methane; and epoxy resins prepared by glycidylating tetrakis phenols, such as 1,1,2,2-tetrakis(4-hydroxyphenyl)ethane.

Examples of novolac epoxy resins include epoxy resins prepared by glycidylating novolacs, such as phenol novolac, cresol novolac, bisphenol A novolac, brominated phenol novolac, and brominated bisphenol A novolac.

Examples of aliphatic ether epoxy resins include epoxy resins prepared by glycidylating polyhydric alcohols, such as glycerol and polyethylene glycol.

Examples of ether ester epoxy resins include epoxy resins prepared by glycidylating hydroxy carboxylic acids, such as para-oxy-benzoic acid.

Examples of ester epoxy resins include epoxy resins prepared by glycidylating polycarboxylic acids, such as phthalic acid and terephthalic acid.

Examples of amine epoxy resins include epoxy resins prepared by glycidylating amine compounds, such as 4,4-diaminodiphynlmethane and m-aminophenol.

Examples of alicyclic epoxy resins include 3,4-epoxycyclohexylmethyl-3',4'-epoxycyclohexane carboxylate, 1,2-epoxy-4-vinylcyclohexane, bis(3,4-epoxycyclohexylmethyl)adipate, 1-epoxy ethyl-3,4-epoxycyclohexane, limonene diepoxide, and 3,4-epoxycyclohexyl methanol.

These epoxy resins (A) may be used singly or in a combination of two or more. Of these epoxy resins (A), bisphenol epoxy resins are preferable, and in particular, bisphenol A or bisphenol F is suitably used.

The curing agent for the epoxy resin (B) for use in the present invention can be any curing agent as long as the curing agent reacts with the epoxy resin (A), and can cure the resin. Examples of curing agents include phenol-based compounds, acid anhydrides, imidazole compounds, carboxylic acid compounds, polythiol-based curing agents, isocyanate compounds, and amine compounds. Of these, phenol-based compounds are preferable.

Examples of phenol-based compounds include phenol novolac, xylylene novolac, Bis-A novolac, triphenylmethane novolac, biphenyl novolac, dicyclopentadiene phenol novolac, and terpene phenol novolac.

Examples of acid anhydrides include carbohydrazide, oxalic acid dihydrazide, malonic acid dihydrazide, succinic acid dihydrazide, adipic acid dihydrazide, pimelic acid dihydrazide, suberic acid dihydrazide, azelaic acid dihydrazide, sebacic acid dihydrazide, dodecanedioic acid dihydrazide, maleic acid dihydrazide, fumaric acid dihydrazide, diglycolic acid hydrazide, tartaric acid dihydrazide, malic acid dihydrazide, isophthalic acid dihydrazide, terephthalic acid dihydrazide, 2,6-naphthoic acid dihydrazide, 4,4-bisbenzenedihydrazide, and 1,4-naphthoic acid dihydrazide.

Examples of imidazole compounds include imidazole, 2-methylimidazole, 2-ethyl-4-methylimidazole, 2-undecylimidazole, 2-heptadecylimidazole, 2-phenylimidazole, and 1-aminoethyl-2-methylimidazole.

Examples of carboxylic acid compounds include vinyl ether block carboxylic acid. Examples of curing methods using the carboxylic acid compounds include a method including reacting an aliphatic vinyl ether with carboxyl groups to generate hemiacetal ester, and subjecting the carboxyl groups generated by a de-blocking reaction of hemiacetal ester and epoxy groups to an addition reaction in the presence of Lewis acid to cure the epoxy resin.

Examples of isocyanate compounds include polyhydric alcohol adducts of toluene diisocyanate, phenylmethane-4,4'-diisocyanate (c-MDI), blocked isocyanates obtained by blocking isocyanates with caprolactam.

Examples of polythiol-based curing agents include aliphatic polythioethers, aliphatic polythioesters, and aromatic ring-containing polythioethers.

Examples of amine compounds include aliphatic polyamines, such as diethylenetriamine, triethylenetetramine, tetraethylenepentamine, m-xylenediamine, trimethyl hexamethylenediamine, 2-methylpentamethylenediamine, and diethylamino propylamine; alicyclic polyamines, such as isophorone diamine, 1,3-bisaminomethyl cyclohexane, bis(4-aminocyclohexyl)methane, norbornene diamine, 1,2-diaminocyclohexane, and Laromin C-260; aromatic polyamines, such as diaminodiphenylmethane, meta-phenylenediamine, and diaminodisulfonyl sulfone; polyoxypropylene diamine; polyoxypropylene triamine; polycyclohexyl polyamine mixtures; and N-aminoethyl piperazine.

These curing agents (B) can be used singly, or in a combination of two or more as long as the combination does not inhibit curing.

Examples of resins for use in the particulate polyolefin-based resin (C) for use in the present invention include low-density polyethylene, high-density polyethylene, polypropylene, and copolymerized polyolefins of olefins with other monomers.

The low-density polyethylene is preferably polyethylene having a density of 0.910 or more to less than 0.930 as defined in JIS K6748:1995 (old version).

The high-density polyethylene is preferably polyethylene having a density of 0.942 or more as defined in JIS K6748:1995 (old version).

The other monomers to copolymerize with olefins are not particularly limited. Examples include ethylenically unsaturated monomers, such as (meth)acrylic acid-based carboxyl group-containing monomers ("(meth)acrylic acid" refers to "acrylic acid" or "methacrylic acid." The same applies hereinafter), and vinyl group-containing monomers, epoxy group-containing monomers, amino group-containing monomers, modified acid group-containing monomers, and monomers containing metal salts of these monomers.

Examples of ethylenically unsaturated monomers include acrylonitrile, vinyl acetate, acrylic acid, methacrylic acid, methyl(meth)acrylate, ethyl(meth)acrylate, propyl(meth)acrylate, butyl(meth)acrylate, and 2-ethylhexyl (meth)acrylate. The "(meth)acry" refers to "acry" or "methcry." The same applies hereinafter.

Examples of epoxy group-containing monomers include glycidyl(meth)acrylate, glycidyl acetate, glycidyl butyrate, glycidyl hexoate, and glycidyl benzoate.

Examples of amino group-containing monomers include dimethylaminoethyl(meth)acrylate, (meth)acrylamide, N,N-butoxymethyl(meth)acrylamide, and N-methylacrylamide.

Examples of modified acid group-containing monomers include maleic anhydride and maleic acid esters.

Examples of these polyolefin-based resins include partially saponified products of copolymers of ethylene with vinyl acetate and copolymers of ethylene with vinyl alcohol, which are saponified products of copolymers of ethylene with vinyl acetate.

Of these polyolefin-based resins, preferable are low-density polyethylene, high-density polyethylene, copolymers of ethylene with epoxy group-containing monomers, copolymers of ethylene with modified acid group-containing monomers, and copolymers of ethylene with ethylenically unsaturated monomers. Particularly preferable are copolymers of ethylene with epoxy group-containing monomers, copolymers of ethylene with modified acid group-containing monomers, and copolymers of ethylene with ethylenically unsaturated monomers. More specifically, suitably usable polyolefin-based resins are, for example, copolymers of ethylene with glycidyl methacrylate, copolymers of ethylene with maleic anhydride, copolymers of ethylene with acrylic acid, terpolymers of ethylene, acrylic acid ester, and maleic anhydride, and saponified products of copolymers of ethylene with vinyl acetate.

For the epoxy resin adhesive of the present invention, a particulate polyolefin-based resin having a volume average particle size of 1 to 25 μm is used. The volume average particle size is preferably 5 to 20 μm, and more preferably 8 to 18 μm. A volume average particle size of more than 25 μm is likely to form an uneven surface on the composition after the epoxy resin adhesive is cured. This is not only undesirable from an aesthetic standpoint but also increases the shrinkage percentage.

A volume average particle size of less than 1 μm increases the viscosity of the epoxy resin adhesive, making the particulate polyolefin-based resin less dispersible.

The volume average particle size of the particulate polyolefin-based resin can be determined by an electrical sensing zone technique (small aperture electrical resistance technique). For example, the volume average particle size can be determined with an electro-detecting particle size distribution analyzer (Beckman Coulter Inc., Coulter multisizer).

The shape of the particles of the polyolefin-based resin for use in the present invention is spherical. "Spherical" as used herein refers to the shape of a particle of the polyolefin-based resin with a ratio of the longest diameter to the shortest diameter (longest diameter/shortest diameter) within the range of 0.98 to 1.02.

The method for producing the particulate polyolefin-based resin (C) for use in the present invention is not particularly limited as long as a spherical particle having a volume average particle size of 1 to 25 μm can be obtained. Examples include a method including mechanically pulverizing a polyolefin-based resin with a high-shear pulverizer, a method including dissolving a polyolefin-based resin in a good solvent, optionally adding a non-solvent, and cooling the mixture to precipitate particles or evaporating the solvent to obtain particles, and a method including mixing a resin, a dispersant, and water to obtain particles of the resin dispersed in water. Of these, the method including mixing a resin, a dispersant, and water to obtain particles of the resin dispersed in water is preferable. This method particularly suitably provides spherical particles. The dispersant as used herein may be a surfactant, and preferable examples include copolymers of ethylene oxide with propylene oxide.

The surface of the particulate polyolefin-based resin for use in the present invention is preferably coated with silica, and the silica surface is more preferably hydrophobized. Coating the surface of the particulate polyolefin-based resin with silica increases the compatibility of the particles with the epoxy resin, making it easy to homogeneously disperse the particles; in addition, it is also likely to contribute to excellent bonding between the particles and the epoxy resin. Silica for use preferably has a granule shape (i.e., particulate silica). Silica is preferably added in an amount of 0.1 to 1.0 parts by mass, per 100 parts by mass of the particulate polyolefin-based resin. Adding silica in an amount of 1.0 part by mass or less makes it less likely for the epoxy resin adhesive to become clouded and spots to be generated on the surface of the composition during curing. Adding Silica in an amount of 0.1 parts by mass or more can increase the dispersibility of the particulate polyolefin-based resin in a solvent (i.e., the particulate polyolefin-based resin can be more homogeneously dispersed).

The particulate polyolefin-based resin may be coated with silica on the entire particle surface, or on part of the particle surface.

The method for coating the particulate polyolefin-based resin with silica is not particularly limited. Adding a suitable amount of silica to a particulate polyolefin-based resin and mixing and stirring the mixture with a typical mixer provide a particulate polyolefin-based resin that has been surface-treated with silica (i.e., a particulate polyolefin-based resin to which silica is adhered or bonded).

The epoxy resin adhesive of the present invention can be obtained by mixing the epoxy resin (A), the curing agent (B), and the particulate polyolefin-based resin (C). The method for mixing these components is not particularly limited. Examples include a method including adding the particulate polyolefin-based resin (C) to a solution of the epoxy resin (A) and the curing agent (B) in an organic solvent and mixing the components.

Examples of organic solvents for dissolving an epoxy resin or a curing agent include aromatic hydrocarbon-based solvents, such as benzene, toluene, xylene, and trimethyl benzene; ketone-based solvents, such as acetone, methyl ethyl ketone, and methyl isobutyl ketone; ether-based solvents, such as tetrahydrofuran; alcohol-based solvents, such as isopropanol, and butanol; ether-alcohol-based solvents, such as 2-methoxy ethanol; and amide-based solvents, such as N-methylpyrrolidone, and N,N-dimethylformamide. These solvents can be used singly or in a combination of two or more.

In the epoxy resin adhesive of the present invention, the proportion of the epoxy resin (A) and the curing agent (B) is not particularly limited, and the resin and the agent can be mixed in any proportion. However, it is preferable to add these components in a ratio of the epoxy equivalent of the epoxy resin (A) to the equivalent of the reaction group in the curing agent (B) (e.g., phenol group for a phenol-based compound) of 1:2 to 2:1, more preferably of 1:1.5 to 1.5:1, and still more preferably of about 1:1.

The amount of the particulate polyolefin-based resin (C) to be added to obtain the epoxy resin adhesive of the present invention is preferably 1 to 50 parts by mass, preferably 2 to 30 parts by mass, and more preferably 3 to 15 parts by mass, per 100 parts by mass of the epoxy resin (A). In another preferable embodiment of the amount of the particulate polyolefin-based resin (C) to be added to obtain the epoxy resin adhesive of the present invention, the amount is preferably 1 to 50 parts by mass, preferably 3 to 49 parts by mass, more preferably 25 to 48 parts by mass, and particularly more preferably 40 to 45 parts by mass, per 100 parts by mass of the epoxy resin (A). Adding the particulate polyolefin-based resin in an amount of 50 parts by mass or less per 100 parts by mass of the epoxy resin decreases the likelihood that "the viscosity of the epoxy resin adhesive will increase and make it difficult to disperse the particulate polyolefin-based resin, thereby resulting in decreases in the adhesiveness and cured strength of the epoxy resin adhesive." Adding the particulate polyolefin-based resin in an amount of 1 part by mass or more enables the adhesive to more preferably exhibit adhesiveness and low shrinkage.

The amount of the particulate polyolefin-based resin (C) to be added to obtain the epoxy resin adhesive of the present invention is preferably 1 to 50 parts by mass, preferably 2 to 30 parts by mass, and more preferably 3 to 15 parts by mass, per 100 parts by mass of the total amount of the epoxy resin (A) and the curing agent (B). Adding the particulate polyolefin-based resin in an amount of 50 parts by mass or less per 100 parts by mass of the epoxy resin decreases the likelihood that "the viscosity of the epoxy resin adhesive will increase and make it difficult to disperse the particulate polyolefin-based resin, thereby resulting in decreases in the adhesiveness and cured strength of the epoxy resin adhesive." Adding the particulate polyolefin-based resin in an amount of 1 part by mass or more enables the adhesive to more preferably exhibit adhesiveness and low shrinkage.

The method for adding the particulate polyolefin-based resin to the epoxy resin is not particularly limited. The particles can be homogeneously dispersed in the resin by stirring with a paddle blade or homogenizer.

The epoxy resin adhesive of the present invention may optionally contain additives, such as lubricants, pigments, coupling agents, and leveling agents. Examples of lubricants include paraffin wax, polyethylene wax, polypropylene wax, microcrystalline wax, ester wax, Vaseline, carnauba wax, fatty acids, fatty acid amide, and fatty acids, such as stearic acid, and metal salts thereof. Examples of pigments include titanium, talc, calcium carbonate, and silica. The coupling agent is not particularly limited, and known coupling agents can be used. Examples of known coupling agents include 3-aminopropyltriethoxysilane, 3-mercaptopropyltriethoxysilane, and 3-isocyanatepropylethoxysilane.

The method for coating a substrate with the epoxy resin adhesive of the present invention is not particularly limited. Examples of methods include brush coating, roller coating, and spray coating. To enhance the coating efficiency, electrostatic spray coating, curtain coating, roll coater coating, or impregnation coating can also be used.

The substrate is not particularly limited, and examples of substrates for use include metal, wood, paper, film products, plastic molded articles, and elastomer. Specifically, examples of metal include stainless steel, aluminum, copper, and brass; examples of film and plastics include aromatic polyester resin, epoxy resin, polycarbonate, polystyrene, ABS, polyethylene, polypropylene, polyacetal, cellulose, polyethylene terephthalate, polybutylene terephthalate, polyvinyl chloride, polyamide, polyphenylene oxide, polyurethane, and unsaturated polyester; examples of elastomer include hot cured rubber, such as natural rubber, polychloroprene rubber, polyurethane rubber, fluorine rubber, silicone rubber, and fluorosilicone rubber, and thermoplastic elastomer, such as olefin-based elastomer, styrene-based elastomer, urethane-based elastomer, polyester-based elastomer, and polyamide-based elastomer.

The method for curing the epoxy resin adhesive of the present invention is not particularly limited. As long as the crosslinking reaction proceeds between the epoxy resin (A) and the curing agent (B), typical curing methods for epoxy adhesive can be used. To facilitate the crosslinking reaction, the epoxy resin may be melted, allowed to stand for curing for a suitable period of time, and then cooled to room temperature.

The present invention also encompasses an agent for inhibiting the shrinkage caused by curing an epoxy resin adhesive, the agent including a spherical-particulate polyolefin-based resin having a volume average particle size of 1 to 25 µm. The agent is added to an epoxy resin adhesive in a suitable amount (preferably 1 to 50 parts by mass, more preferably 2 to 30 parts by mass, and still more preferably 3 to 15 parts by mass, per 100 parts by mass of the epoxy resin, or preferably 1 to 50 parts by mass, more preferably 2 to 30 parts by mass, and still more preferably 3 to 15 parts by mass, per 100 parts by mass of the total amount of the epoxy resin and the curing agent) to inhibit the adhesive from shrinking when the adhesive is cured. The agent, even when added to an epoxy resin adhesive, has little adverse effect on the adhesiveness of the epoxy resin adhesive. Epoxy resin adhesives to which the agent of the present invention is added preferably contain the epoxy resin (A)

and the curing agent (B). The details of the epoxy resin (A) and curing agent (B) in this epoxy resin adhesive and the details of the particulate polyolefin-based resin having a spherical shape and a volume average particle size of 1 to 25 μm for use as an agent for inhibiting the shrinkage caused by curing an epoxy resin adhesive are also as described above.

EXAMPLES

The following Examples describe the present invention in detail. However, the Examples are intended to illustrate the present invention, and do not limit the scope of the present invention.

Cured Adhesive Film Evaluation Method
Curing Method

A 1-mm-thick masking tape was adhered to a glass slide (76 mm in height×52 mm in length) for a 10-mm width from each slide edge. A suitable amount of an adhesive was dropped on the glass slide, and the adhesive was uniformly spread with a scraper in an area of 56 mm in height×32 mm in length on the glass surface. A primary curing and drying were performed at 150° C. for 3 hours. A secondary curing and drying were then performed at 180° C. for 3 hours, followed by cooling to room temperature.

Shrinkage Percentage

The shrinkage percentage of the cured and dried film was calculated in accordance with the following equation.

shrinkage percentage (%)={coated surface area (cm$^2$)−dry film area(cm$^2$)}/coated surface area (cm$^2$)×100

A shrinkage percentage of 30% or less is considered to be low shrinkage.

Cross-Cut Test

With reference to JIS K5600 (former JIS K5400) (Cross-Cut Tape Peeling Test), the film was cut with a utility knife in a grid pattern with 3 mm spacing (10×10 grid, i.e., 100 squares in total) so that the cut reached the glass slide. Then, a gummed tape was pasted on the cut portion on the film. One to two minutes after the tape was adhered, one end of the tape was held by hand, peeled at a right angle, and followed by an adhesiveness evaluation. The following shows the evaluation criteria. The term "grid" in this evaluation criteria refers to the cut in a grid pattern of 10×10 (100 squares in total) made on the film.

Cross-Cut Test Evaluation Criteria
1: The grid is not peeled, or less than 20% of the grid is peeled off
2: 20% or more of the grid is peeled off
3: 50% or more of the grid is peeled off Slip Shear Strength A 1-mm-thick masking tape was adhered to an aluminum plate (76 mm in height×45 mm in length×1 mm in thickness) for a 10-mm width from each slide edge. A suitable amount of an adhesive was dropped on the aluminum plate, and the adhesive was uniformly spread with a scraper in an area of 56 mm in height×25 mm in length on the plate. Another same-size aluminum plate to be adhered was placed on the other plate in an offset position so that the adhesion area was 25 mm×10 mm. The adhered plates were cured and dried at 150° C. in an oven for 1 hour, and then allowed to cool down at room temperature (25° C.) for 1 hour so that the plates bonded to each other. The adhered aluminum plates were then measured for slip shear strength with an autograph (Shimadzu AGS-J) at a tension rate of 1 mm/min.

Particle Shape Measurement Method

Prepared particulate polyolefin-based resins were observed at magnifications of 50 to 300× with an electron microscope (JEOL Ltd., JEOL JSM-6390LA), and the shape of the particles was examined. As stated above, particles of a polyolefin-based resin with a ratio of the longest diameter to the shortest diameter (longest diameter/shortest diameter) within the range of 0.98 to 1.02 were considered to be spherical.

Table 1 shows the results of an electron microscope observation of the particles obtained in Production Example 3 described below, and Table 2 shows the results of an electron microscope observation of the particles obtained in Production Example 7 described below.

Particle Size Measurement Method

The volume average particle size was measured with an electro-detecting particle size distribution analyzer (Beckman Coulter Inc., Coulter multisizer). Specifically, 20 mL of Isoton II (Beckman Coulter Inc., electrolyte) and 0.2 mL of an anionic surfactant, such as alkyl sodium sulfate, were placed in a 100-mL beaker and mixed. 0.1 g of the particles obtained in the Production Examples was individually added thereto, and each of the mixtures was exposed to ultrasound for 3 minutes while stirring using a spatula to allow the particles to disperse. These dispersions were used to measure the volume average particle size with an electro-detecting particle size distribution analyzer (Beckman Coulter Inc., Coulter multisizer).

Production Example 1

A 500-mL pressure-resistant container equipped with a stirrer was filled with 100 g of low-density polyethylene resin (LDPE), 15 g of a copolymer of ethylene oxide with propylene oxide (Adeka Corporation, trade name: Pluronic F108, ethylene oxide content: 80% by mass) as an emulsifier, and 135 g of water, and hermetically sealed. Subsequently, while the mixture was stirred at 500 rotations per minute, the temperature was increased to 180° C. With the temperature being maintained at 180° C. inside the container, the mixture was stirred for 30 minutes, and then cooled to 50° C., thereby preparing an aqueous dispersion of polyethylene. The aqueous dispersion was filtered through filter paper, and washed with water, followed by drying at 60° C. for 24 hours with a vacuum dryer, thereby producing spherical polyethylene particles having a volume average particle size of 10 μm.

Production Example 2

A 500-mL pressure-resistant container equipped with a stirrer was filled with 100 g of low-density polyethylene resin (LDPE), 15 g of a copolymer of ethylene oxide with propylene oxide (Adeka Corporation, trade name: Pluronic F108, ethylene oxide content: 80% by mass) as an emulsifier, and 135 g of water, and hermetically sealed. Subsequently, while the mixture was stirred at 500 rotations per minute, the temperature was increased to 180° C. With the temperature being maintained at 180° C. inside the container, the mixture was stirred for 30 minutes, and then cooled to 50° C., thereby preparing an aqueous dispersion of polyethylene. The aqueous dispersion was filtered through filter paper, and washed with water, followed by drying at 60° C. for 24 hours with a vacuum dryer, thereby preparing polyethylene particles. 0.32 g of silica particles to which a hydrophobic treatment was applied (Nippon Aerosil Co., Ltd. R972) was added to 80 g of the prepared particles, and stirred and mixed with a mixer, followed by classification, thereby producing spherical polyethylene particles having a volume average particle size of 10 μm.

Production Example 3

A 500 mL pressure-resistant container equipped with a stirrer was filled with 100 g of high-density polyethylene resin (HDPE), 15 g of a copolymer of ethylene oxide with propylene oxide (Adeka Corporation, trade name: Pluronic F108, ethylene oxide content: 80% by mass) as an emulsifier, and 135 g of water, and hermetically sealed. Subsequently, while the mixture was stirred at 500 rotations per minute, the temperature was increased to 180° C. With the temperature being maintained at 180° C. inside the container, the mixture was stirred for 30 minutes, and then cooled to 50° C., thereby preparing an aqueous dispersion of polyethylene. The aqueous dispersion was filtered through filter paper, and washed with water, followed by drying at 60° C. for 24 hours with a vacuum dryer, thereby preparing polyethylene particles. 0.32 g of silica particles to which a hydrophobic treatment was applied (Nippon Aerosil Co., Ltd. R972) was added to 80 g of the prepared particles, and stirred and mixed with a mixer, followed by classification, thereby producing spherical polyethylene particles having a volume average particle size of 13 μm (FIG. 1).

Production Example 4

A 500-mL pressure-resistant container equipped with a stirrer was filled with 100 g of a copolymer resin of ethylene with glycidyl methacrylate (GMA content: 20% by mass), 15 g of a copolymer of ethylene oxide with propylene oxide (Adeka Corporation, trade name: Pluronic F108, ethylene oxide content 80% by mass) as an emulsifier, and 135 g of water, and hermetically sealed. Subsequently, while the mixture was stirred at 500 rotations per minute, the temperature was increased to 150° C. With the temperature being maintained at 150° C. inside the container, the mixture was stirred for 30 minutes, and then cooled to 50° C., thereby preparing an aqueous dispersion of the copolymer of ethylene with glycidyl methacrylate. The aqueous dispersion was filtered through filter paper, and washed with water, followed by drying at 60° C. for 24 hours with a vacuum dryer, thereby preparing particles of the copolymer of ethylene with glycidyl methacrylate. 0.32 g of silica particles to which a hydrophobic treatment was applied (Nippon Aerosil Co., Ltd. RX200) was added to 80 g of the prepared particles, and stirred and mixed with a mixer, followed by classification, thereby producing spherical particles of the copolymer of ethylene with glycidyl methacrylate having a volume average particle size of 17 μm.

Production Example 5

A 500-mL pressure-resistant container equipped with a stirrer was filled with 100 g of a modified polyolefin resin (a copolymer of ethylene with maleic anhydride, maleic anhydride content: 3% by mass), 15 g of a copolymer of ethylene oxide with propylene oxide (Adeka Corporation, trade name: Pluronic F108, ethylene oxide content: 80% by mass) as an emulsifier, and 135 g of water, and hermetically sealed. Subsequently, while the mixture was stirred at 500 rotations per minute, the temperature was increased to 180° C. With the temperature being maintained at 180° C. inside the container, the mixture was stirred for 30 minutes, and then cooled to 50° C., thereby preparing an aqueous dispersion of the copolymer of ethylene with maleic anhydride. The aqueous dispersion was filtered through filter paper, and washed with water, followed by drying at 60° C. for 24 hours with a vacuum dryer, thereby preparing particles of the copolymer of ethylene with maleic anhydride. 0.32 g of silica particles to which a hydrophobic treatment was applied (Nippon Aerosil Co., Ltd. R974) was added to 80 g of the prepared particles, and stirred and mixed with a mixer, followed by classification, thereby producing spherical particles of the copolymer of ethylene with maleic anhydride having a volume average particle size of 9 μm.

Production Example 6

A 500-mL pressure-resistant container equipped with a stirrer was filled with 100 g of a copolymer resin of ethylene with acrylic acid (acrylic acid content: 7% by mass), 15 g of a copolymer of ethylene oxide with propylene oxide (Adeka Corporation, trade name: Pluronic F108, ethylene oxide content: 80% by mass) as an emulsifier, and 135 g of water, and hermetically sealed. Subsequently, while the mixture was stirred at 500 rotations per minute, the temperature was increased to 180° C. With the temperature being maintained at 180° C. inside the container, the mixture was stirred for 30 minutes, and then cooled to 50° C., thereby preparing an aqueous dispersion of the copolymer of ethylene with acrylic acid. The aqueous dispersion was filtered through filter paper, and washed with water, followed by drying at 60° C. for 24 hours with a vacuum dryer, thereby preparing polyethylene particles. 0.32 g of silica particles to which a hydrophobic treatment was applied (Tosoh Silica Corporation, Nipsil SS100) was added to 80 g of the prepared particles, and stirred and mixed with a mixer, followed by classification, thereby producing spherical particles of the copolymer of ethylene with acrylic acid having a volume average particle size of 12 μm.

Production Example 7

Figure 2:
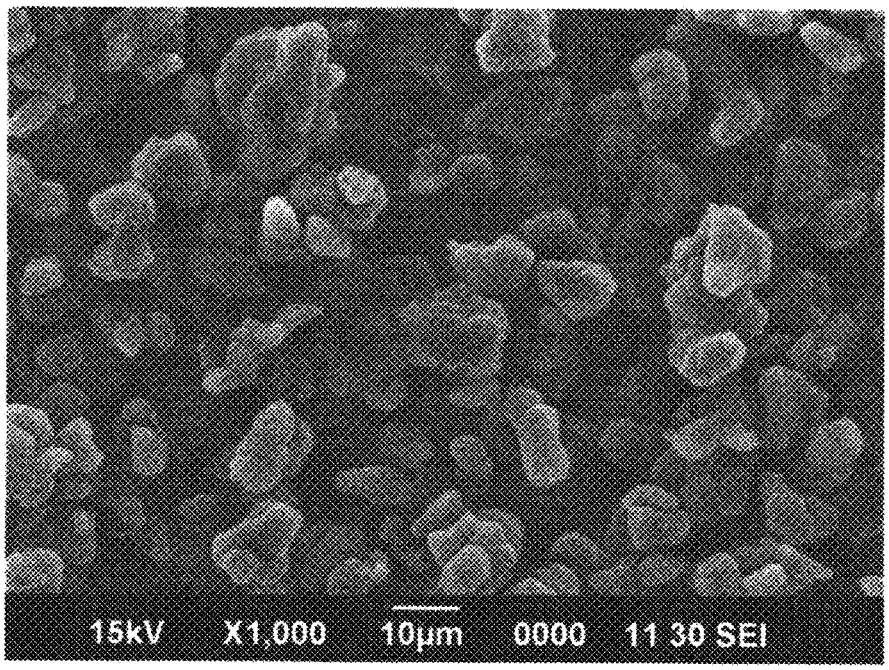
FIG. 2 shows the results of electron microscope observation of particles obtained in Production Example 7.

A 1,000-mL four-necked flask was filled with 495 g of hot xylene at 130 to 140° C. and 25 g of low-density polyethylene (LDPE). While being stirred at a high rate, the mixture was cooled to room temperature to precipitate a fine powder of polyethylene. The precipitated polymer was taken out, washed with water, and dried, thereby preparing polyethylene particles. The particles were then classified, thereby giving particles having a volume average particle size of 15 μm. The particles had an irregular shape(Fig. 2).

Production Example 8

The particles obtained in Production Example 2 were classified, thereby giving particles having a volume average particle size of 30 μm.

Example 1

Preparation of Epoxy Resin
Bisphenol A epoxy resin (Epiclon 1050; DIC, epoxy equivalent: 476) was dissolved in a methyl ethyl ketone solvent to give a concentration of 70% by mass.
Preparation of Curing Agent
A phenol-based curing agent for epoxy resin (HF-1M: Meiwa Plastic Industries, Ltd., phenol number 105) was dissolved in a methyl ethyl ketone solvent to give a concentration of 70% by mass.

Preparation of Epoxy Resin Adhesive

The solution of epoxy resin in methyl ethyl ketone and the solution of phenol-based curing resin, both having a concentration of 70% by mass, were mixed to give a ratio of 4.5:1 on a mass basis (epoxy equivalent: phenol number=1:1). 5 parts by mass of the low-density polyethylene particles obtained in Production Example 1 was added to 95 parts by mass of the mixed solution, and stirred and mixed to prepare an epoxy resin adhesive. The obtained adhesive was used to form a film under the curing conditions described above, and the film was evaluated in accordance with the respective evaluation methods. Table 1 shows the results.

Example 2

The procedure of Example 1 was repeated except that the low-density polyethylene particles obtained in Production Example 2 were used as a particulate polyolefin-based resin, thereby preparing an epoxy resin adhesive. The prepared adhesive was used to form a film under the curing conditions described above, and the film was evaluated in accordance with the respective evaluation methods. Table 1 shows the results.

Example 3

The procedure of Example 1 was repeated except that the high-density polyethylene particles obtained in Production Example 3 were used as a particulate polyolefin-based resin, thereby preparing an epoxy resin adhesive. The prepared adhesive was used to form a film under the curing conditions described above, and the film was evaluated in accordance with the respective evaluation methods. Table 1 shows the results.

Example 4

The procedure of Example 1 was repeated except that the particles of the copolymer of ethylene with glycidyl methacrylate obtained in Production Example 4 were used as a particulate polyolefin-based resin, thereby preparing an epoxy resin adhesive. The prepared adhesive was used to form a film under the curing conditions described above, and the film was evaluated in accordance with the respective evaluation methods. Table 1 shows the results.

Example 5

The procedure of Example 1 was repeated except that the particles of the copolymer of ethylene with maleic anhydride obtained in Production Example 5 were used as a particulate polyolefin-based resin, thereby preparing an epoxy resin adhesive. The prepared adhesive was used to form a film under the curing conditions described above, and the film was evaluated in accordance with the respective evaluation methods. Table 1 shows the results.

Examples 6

The procedure of Example 1 was repeated except that the particles of the copolymer of ethylene with acrylic acid obtained in Production Example 6 were used as a particulate polyolefin-based resin, thereby preparing an epoxy resin adhesive. The prepared adhesive was used to form a film under the curing conditions described above, and the film was evaluated in accordance with the respective evaluation methods. Table 1 shows the results.

Comparative Example 1

The procedure of Example 1 was repeated except that low-density polyethylene particles were not added, thereby preparing an epoxy resin adhesive. The prepared adhesive was used to form a film under the curing conditions described above, and the film was evaluated in accordance with the respective evaluation methods. Table 1 shows the results.

Comparative Example 2

Evaluations were conducted in the same manner as above except that the particulate polyolefin-based resin was replaced by the low-density polyethylene particles having a volume average particle size of 30 μm obtained in Production Example 8. The prepared adhesive was used to form a film under the curing conditions described above, and the film was evaluated in accordance with the respective evaluation methods. Table 1 shows the results.

Comparative Example 3

The procedure of Example 1 was repeated except that the low-density polyethylene particles obtained in Production Example 7 were used as a particulate polyolefin-based resin, thereby preparing an epoxy resin adhesive. The prepared adhesive was used to form a film under the curing conditions described above, and the film was evaluated in accordance with the respective evaluation methods. Table 1 shows the results.

Comparative Example 4

The procedure of Example 2 was repeated except that 55 parts by weight of low-density polyethylene particles were added, thereby preparing an epoxy resin adhesive. The prepared adhesive was used to form a film under the curing conditions described above, and the film was evaluated in accordance with the respective evaluation methods. Table 1 shows the results.

TABLE 1

| | Polyolefin Particles | Amount of Particles Added (wt %) | Volume Average Particle Size (μm) | Particle Shape | Silica Addition | Cross-Cut Test | Shrinkage Percentage (%) | Slip Shear Strength (N/cm$^2$) |
|---|---|---|---|---|---|---|---|---|
| Example 1 | LDPE | 5 | 10 | Spherical | Not Added | 2 | 20 | 100 |
| Example 2 | | 5 | 10 | Spherical | Added | 2 | 20 | 120 |
| Example 3 | HDPE | 5 | 13 | Spherical | Added | 2 | 22 | 131 |
| Example 4 | E-GMA | 5 | 17 | Spherical | Added | 1 | 0 | 182 |

TABLE 1-continued

|  | Polyolefin Particles | Amount of Particles Added (wt %) | Volume Average Particle Size (μm) | Particle Shape | Silica Addition | Cross-Cut Test | Shrinkage Percentage (%) | Slip Shear Strength (N/cm²) |
|---|---|---|---|---|---|---|---|---|
| Example 5 | E-Maleic Anhydride | 5 | 9 | Spherical | Added | 1 | 15 | 190 |
| Example 6 | EAA | 5 | 12 | Spherical | Added | 1 | 21 | 209 |
| Comp. Ex. 1 | None | 0 | — | N/A | Not Added | 2 | 49 | 117 |
| Comp. Ex. 2 | LDPE | 5 | 30 | Spherical | Added | 2 | 45 | 120 |
| Comp. Ex. 3 |  | 5 | 15 | Irregular | Not Added | 3 | 40 | 90 |
| Comp. Ex. 4 |  | 55 | 10 | Spherical | Added | 3 | 40 | 80 |

The results revealed that adding, to an epoxy resin adhesive, spherical particles of a polyolefin-based resin having a volume average particle size of 1 to 25 μm in an amount of 1 to 50 parts by mass per 100 parts by mass of the epoxy resin produces a low shrinkage effect due to stress relaxation occurring while curing. The results also revealed that adding particles of a copolymeric polyolefin-based resin produces a low shrinkage effect and enhances slip shear strength.

Thermally curing the epoxy resin adhesive of the present invention provides a cured product excellent in low shrinkage properties and adhesiveness, and the present invention solves the problems associated with the adhesiveness of an article coated with an epoxy resin adhesive, as well as wrinkles and warping generated on an article coated with an epoxy resin adhesive and on a substrate adhered to an article coated with an epoxy resin adhesive.

The invention claimed is:

1. An epoxy resin adhesive comprising (A) an epoxy resin, (B) a curing agent, and (C) a particulate polyethylene-based resin having a volume average particle size of 1 to 25 μm,
    wherein the particulate polyethylene-based resin is spherical,
    the particulate polyethylene-based resin is present in an amount of 1 to 50 parts by mass per 100 parts by mass of the epoxy resin,
    the particulate polyethylene-based resin is coated with hydrophobized silica,
    the amount of hydrophobized silica is 0.1 to 1 parts by mass per 100 parts by mass of the particulate polyethylene-based resin,
    the hydrophobized silica surface is hydrophobized,
    the polyethylene-based resin comprises at least one member selected from the group consisting of copolymers of ethylene with an epoxy group-containing monomer, copolymers of ethylene with a modified acid group-containing monomer, and copolymers of ethylene with an ethylenically unsaturated monomer,
    the epoxy group-containing monomer comprises glycidyl (meth)acrylate,
    the modified acid group-containing monomer comprises at least one member selected from the group consisting of maleic anhydride and maleic acid esters,
    the ethylenically unsaturated monomer comprises at least acrylonitrile,
    the epoxy resin comprises at least one member selected from the group consisting of mono-epoxy compounds and polyvalent epoxy compounds, and
    the curing agent comprises at least one member selected from the group consisting of phenol-based compounds, acid anhydrides, imidazole compounds, carboxylic acid compounds, polythiol-based curing agents, isocyanate compounds, and amine compounds.

2. An epoxy resin adhesive comprising (A) an epoxy resin, (B) a curing agent, and (C) a particulate polyethylene-based resin having a volume average particle size of 1 to 25 μm,
    wherein the particulate polyethylene-based resin is spherical,
    the particulate polyethylene-based resin is present in an amount of 1 to 50 parts by mass per 100 parts by mass of the total amount of the epoxy resin and the curing agent,
    the particulate polyethylene-based resin is coated with hydrophobized silica,
    the amount of hydrophobized silica is 0.1 to 1 parts by mass per 100 parts by mass of the particulate polyethylene-based resin,
    the hydrophobized silica surface is hydrophobized,
    the polyethylene-based resin comprises at least one member selected from the group consisting of copolymers of ethylene with an epoxy group-containing monomer, copolymers of ethylene with a modified acid group-containing monomer, and copolymers of ethylene with an ethylenically unsaturated monomer,
    the epoxy group-containing monomer comprises glycidyl (meth)acrylate,
    the modified acid group-containing monomer comprises at least one member selected from the group consisting of maleic anhydride and maleic acid esters,
    the ethylenically unsaturated monomer comprises at least acrylonitrile,
    the epoxy resin comprises at least one member selected from the group consisting of mono-epoxy compounds and polyvalent epoxy compounds, and
    the curing agent comprises at least one member selected from the group consisting of phenol-based compounds, acid anhydrides, imidazole compounds, carboxylic acid compounds, polythiol-based curing agents, isocyanate compounds, and amine compounds.

3. The epoxy resin adhesive according to claim 1, further comprising a lubricant.

4. The epoxy resin adhesive according to claim 2, further comprising a lubricant.

5. The epoxy resin adhesive according to claim 1, wherein the particulate polyethylene-based resin has a volume average particle size of 5 to 20 μm.

6. The epoxy resin adhesive according to claim 1, wherein the particulate polyethylene-based resin is present in an amount of 3 to 49 parts by mass per 100 parts by mass of the epoxy resin.

7. The epoxy resin adhesive according to claim 2, wherein the particulate polyethylene-based resin has a volume average particle size of 5 to 20 μm.

8. The epoxy resin adhesive according to claim 2, wherein the particulate polyethylene-based resin is present in an amount of 2 to 30 parts by mass per 100 parts by mass of the epoxy resin.

9. The epoxy resin adhesive according to claim 1,
wherein the mono-epoxy compound comprises at least one member selected from the group consisting of butyl glycidyl ether, hexyl glycidyl ether, phenyl glycidyl ether, allyl glycidyl ether, para-butylphenyl glycidyl ether, para-xylyl glycidyl ether, glycidyl acetate, glycidyl butyrate, glycidyl hexoate, and glycidyl benzoate, and
the polyvalent epoxy compound comprises at least one member selected from the group consisting of epoxy resins prepared by glycidylating dihydric or polyhydric phenols, aliphatic ether epoxy resins, ether ester epoxy resins, ester epoxy resins, amine epoxy resins, and alicyclic epoxy resins.

10. The epoxy resin adhesive according to claim 1, wherein the particulate polyethylene-based resin is present in an amount of 3 to 15 parts by mass per 100 parts by mass of the epoxy resin.

11. The epoxy resin adhesive according to claim 1, wherein the particulate polyethylene-based resin has a volume average particle size of 8 to 18 μm.

12. The epoxy resin adhesive according to claim 1, wherein the curing agent is a phenol-based compound.

13. The epoxy resin adhesive according to claim 1, wherein the epoxy resin is Bisphenol A epoxy resin.

14. The epoxy resin adhesive according to claim 2,
wherein the mono-epoxy compound comprises at least one member selected from the group consisting of butyl glycidyl ether, hexyl glycidyl ether, phenyl glycidyl ether, allyl glycidyl ether, para-butylphenyl glycidyl ether, para-xylyl glycidyl ether, glycidyl acetate, glycidyl butyrate, glycidyl hexoate, and glycidyl benzoate, and
the polyvalent epoxy compound comprises at least one member selected from the group consisting of epoxy resins prepared by glycidylating dihydric or polyhydric phenols, aliphatic ether epoxy resins, ether ester epoxy resins, ester epoxy resins, amine epoxy resins, and alicyclic epoxy resins.

15. The epoxy resin adhesive according to claim 2, wherein the particulate polyethylene-based resin is present in an amount of 3 to 15 parts by mass per 100 parts by mass of the epoxy resin.

16. The epoxy resin adhesive according to claim 2, wherein the particulate polyethylene-based resin has a volume average particle size of 8 to 18 μm.

17. The epoxy resin adhesive according to claim 2, wherein the curing agent is a phenol-based compound.

18. The epoxy resin adhesive according to claim 2, wherein the epoxy resin is Bisphenol A epoxy resin.

19. The epoxy resin adhesive according to claim 1,
wherein the mono-epoxy compound comprises at least one member selected from the group consisting of butyl glycidyl ether, hexyl glycidyl ether, phenyl glycidyl ether, allyl glycidyl ether, para-butylphenyl glycidyl ether, para-xylyl glycidyl ether, glycidyl acetate, glycidyl butyrate, glycidyl hexoate, and glycidyl benzoate, and
the polyvalent epoxy compound comprises at least one member selected from the group consisting of bisphenol epoxy resins, and novolac epoxy resins.

20. The epoxy resin adhesive according to claim 2,
wherein the mono-epoxy compound comprises at least one member selected from the group consisting of butyl glycidyl ether, hexyl glycidyl ether, phenyl glycidyl ether, allyl glycidyl ether, para-butylphenyl glycidyl ether, para-xylyl glycidyl ether, glycidyl acetate, glycidyl butyrate, glycidyl hexoate, and glycidyl benzoate, and
the polyvalent epoxy compound comprises at least one member selected from the group consisting of bisphenol epoxy resins, and novolac epoxy resins.

* * * * *